(12) United States Patent
Nakayama et al.

(10) Patent No.: US 10,114,888 B2
(45) Date of Patent: Oct. 30, 2018

(54) TERMINAL, SYSTEM, METHOD, AND PROGRAM FOR PRESENTING SENTENCE CANDIDATE

(71) Applicant: Y's Reading Inc., Kumamoto (JP)

(72) Inventors: Yoshiharu Nakayama, Kumamoto (JP); Satoru Saito, Kumamoto (JP)

(73) Assignee: Y'S READING INC., Kumamoto-Shi (JP)

( * ) Notice: Subject to any disclaimer, the term of this patent is extended or adjusted under 35 U.S.C. 154(b) by 328 days.

(21) Appl. No.: 15/041,145

(22) Filed: Feb. 11, 2016

(65) Prior Publication Data

US 2017/0017718 A1 Jan. 19, 2017

(30) Foreign Application Priority Data

Jul. 13, 2015 (JP) .................................. 2015-139839

(51) Int. Cl.
*G06F 17/30* (2006.01)

(52) U.S. Cl.
CPC .............................. *G06F 17/30684* (2013.01)

(58) Field of Classification Search
USPC ........................................................ 707/730
See application file for complete search history.

(56) References Cited

U.S. PATENT DOCUMENTS

| | | | | |
|---|---|---|---|---|
| 7,587,395 B2* | 9/2009 | Harney | ............. | G06F 17/30663 |
| 8,688,673 B2* | 4/2014 | Sarkar | ............... | G06F 17/30705 |
| | | | | 707/706 |
| 2012/0150537 A1* | 6/2012 | Abe | .................. | G06F 17/30787 |
| | | | | 704/235 |
| 2013/0086086 A1* | 4/2013 | Kataoka | ............ | G06F 17/30616 |
| | | | | 707/750 |
| 2016/0006730 A1* | 1/2016 | Chari | ....................... | G06F 21/32 |
| | | | | 726/7 |
| 2016/0078038 A1* | 3/2016 | Solanki | ............. | G06F 17/30719 |
| | | | | 707/727 |
| 2016/0328366 A1* | 11/2016 | Elarian | .................. | G06F 17/214 |
| 2016/0328620 A1* | 11/2016 | Elarian | ............. | G06K 9/00859 |
| 2017/0228607 A1* | 8/2017 | Elarian | ............. | G06K 9/00859 |

FOREIGN PATENT DOCUMENTS

JP 2004-133564 4/2004

* cited by examiner

*Primary Examiner* — Kim T Nguyen
(74) *Attorney, Agent, or Firm* — Lex IP Meister, PLLC

(57) ABSTRACT

The present invention is to provide a terminal for presenting a sentence candidate that presents a candidate to improve the work efficiency and to standardize a sentence, when a report is generated. The terminal for presenting a sentence candidate 100 is capable of presenting a more appropriate sentence candidate by including a report data base 131 that stores a report including a plurality of sentences, searching the report data base by an input character, generating a report group including a plurality of reports as a search result, extracting a sentence containing a character input from the report group to generate a sentence group, and preferentially outputting a predetermined sentence based on a priority.

4 Claims, 17 Drawing Sheets

Fig. 7

```
Step S51
    Sentence 1  The lumbar vertebra shows a slight irregular alignment.
        :
        :
    Sentence N  The lumbar vertebra shows a straight alignment.
```

```
Step S55

Sentence 1 Number of elements: 4
lumbar vertebra/slight/irregular/alignment
```

```
Step S55

Sentence N Number of elements: 3
lumbar vertebra/straight/alignment
```

```
Step S57

Sentence 1 Number of elements: 4
lumbar vertebra/slight/irregular/alignment
        5  /   4   /    3
```

```
Step S57

Sentence N Number of elements: 3
lumbar vertebra/straight/alignment
        5   /   4
```

```
Step S58

Score addition of "alignment" in sentence 1
    3/Number of elements: 4 = 0.75
```

```
Step S58

Score addition of "alignment" in sentence N
    4/Number of elements: 3 = 1.33
```

Fig. 9
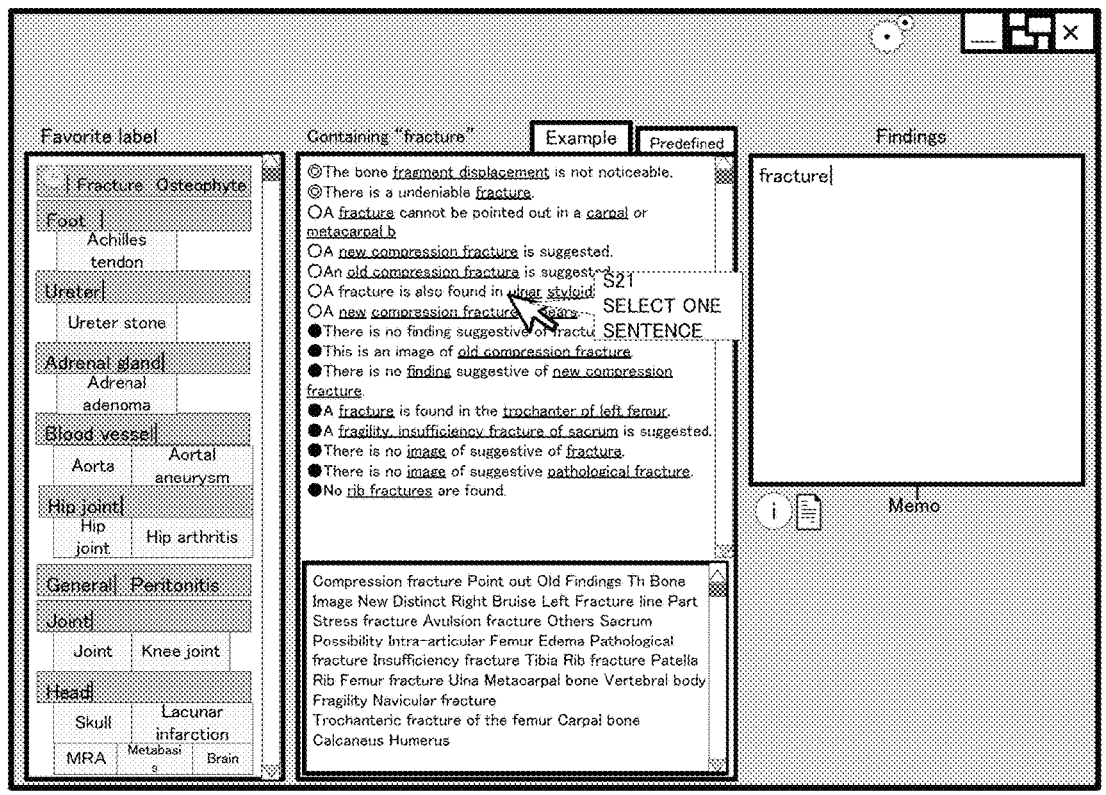
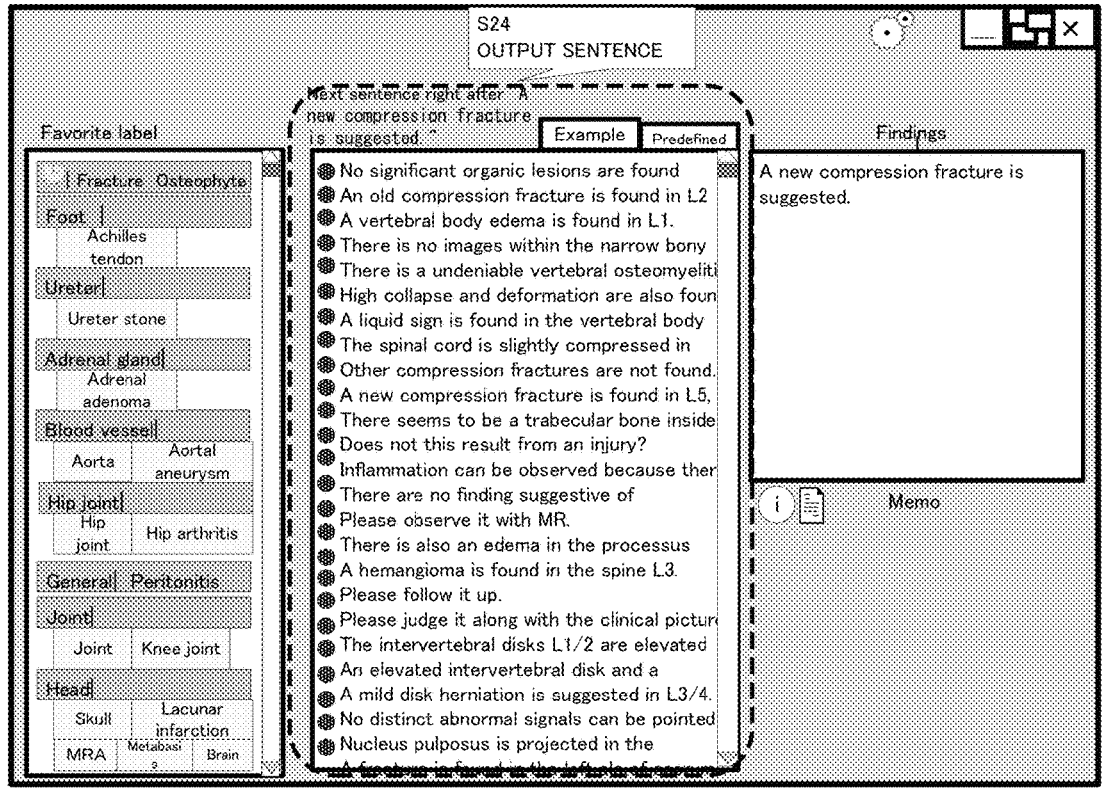

Fig. 10
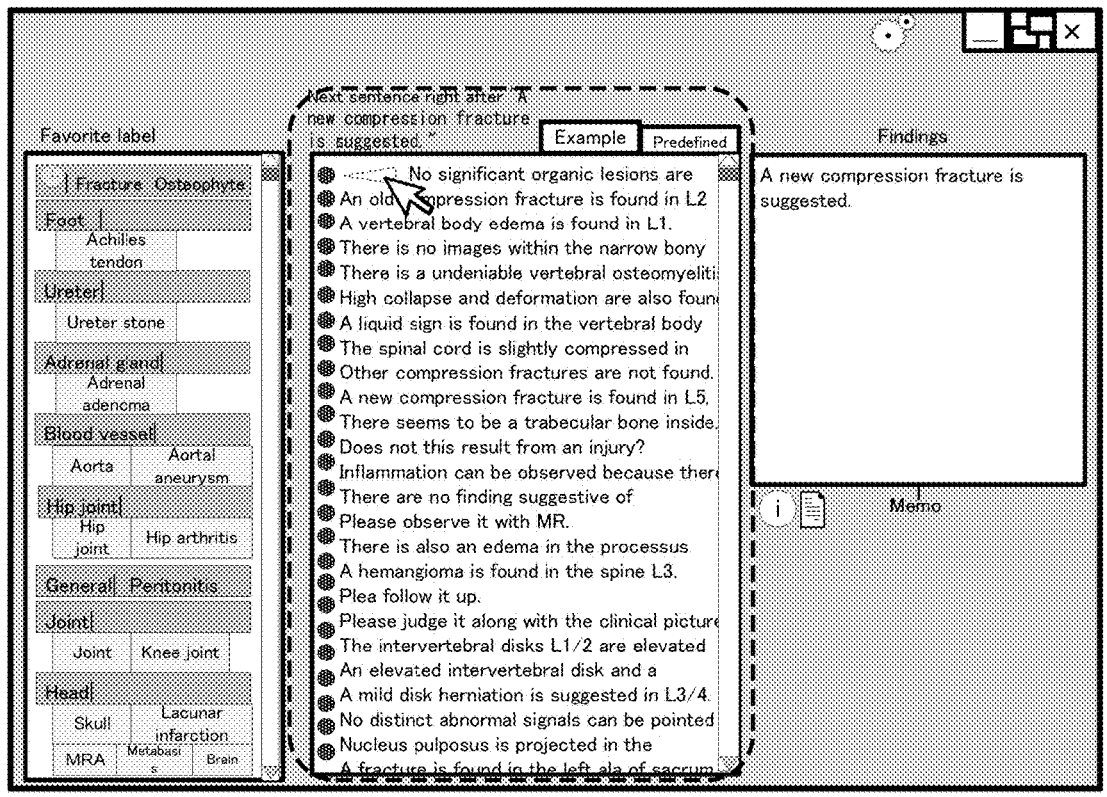
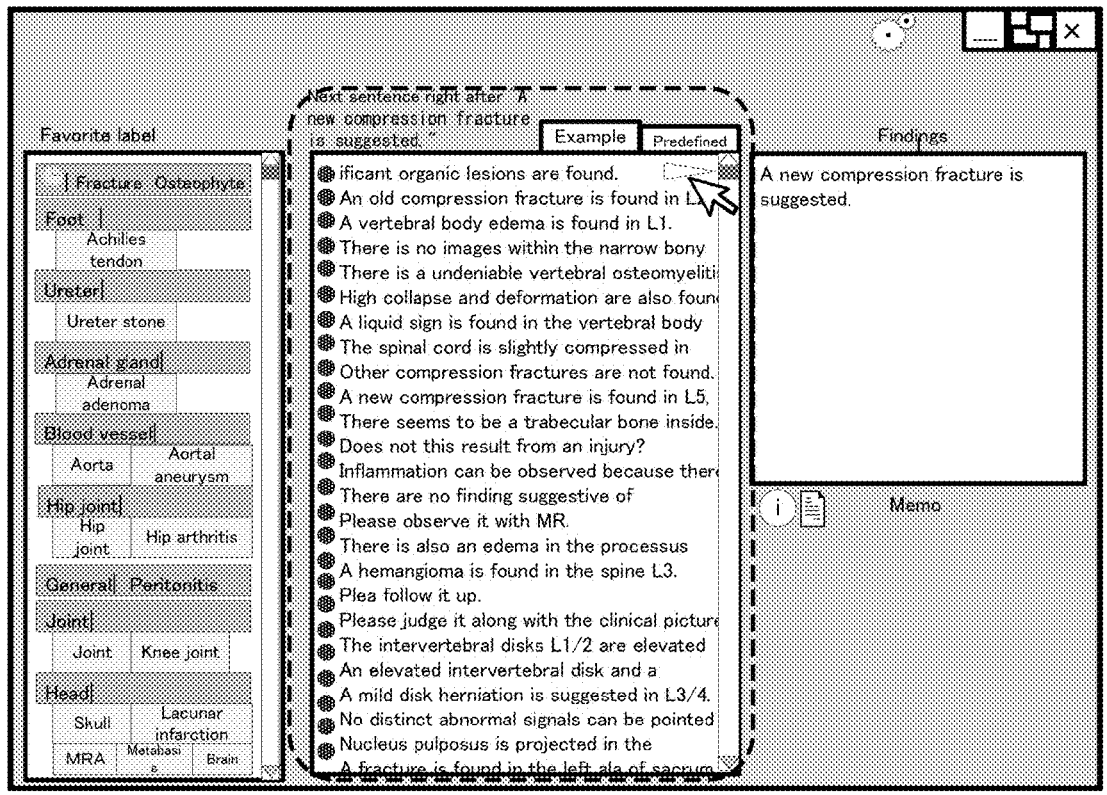

Fig. 12
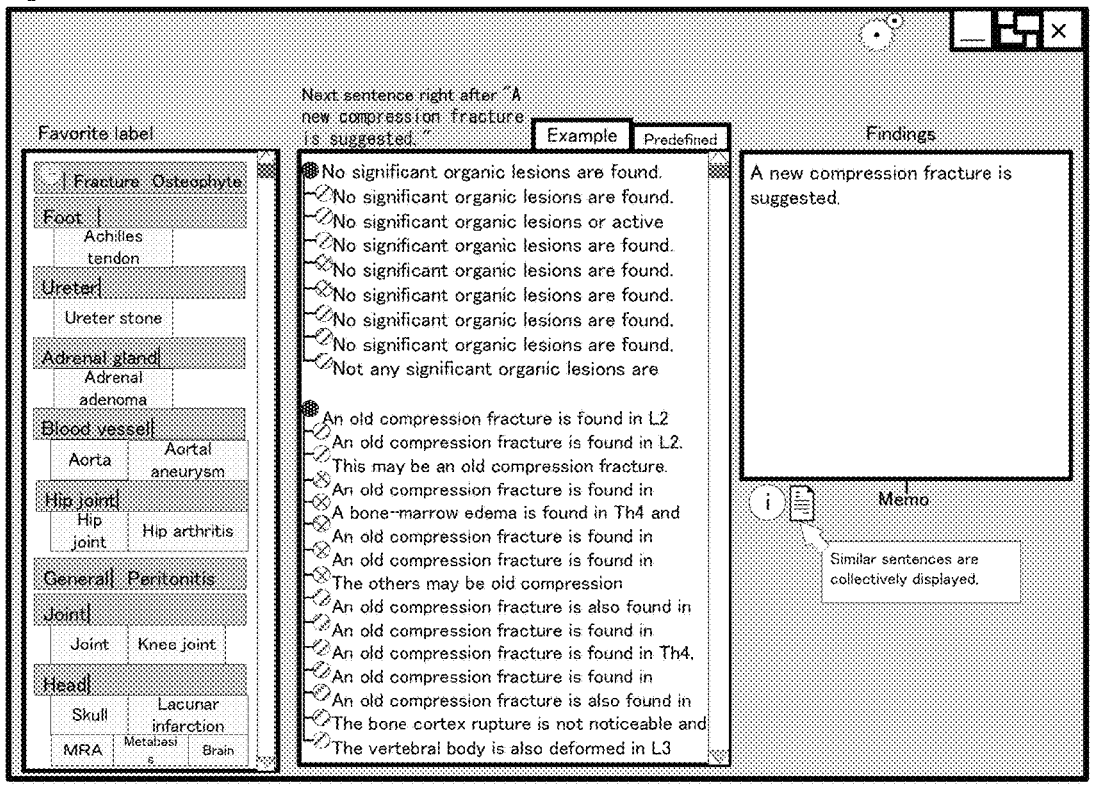
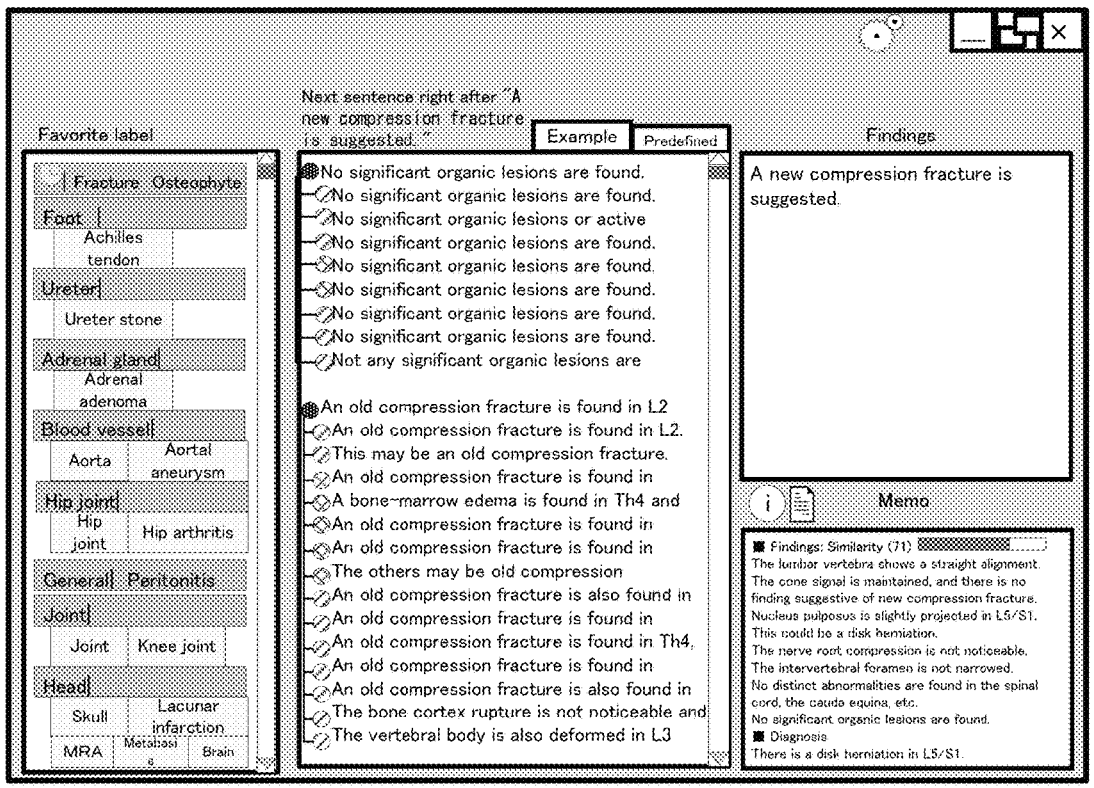

TERMINAL, SYSTEM, METHOD, AND PROGRAM FOR PRESENTING SENTENCE CANDIDATE

CROSS REFERENCE TO RELATED APPLICATIONS

This application claims priority to Japanese Patent Application No. 2015-139839 filed on Jul. 13, 2015, the entire contents of which are incorporated by reference herein.

TECHNICAL FIELD

The present invention relates to a terminal for presenting a sentence candidate based on an input character and sentence.

BACKGROUND ART

Systems retrieving and presenting candidate character strings and sentences based on input characters are known. For example, the candidate character strings are presented at the same time when characters are input, in internet search engines such as Google® and Yahoo!®.

Moreover, the system hierarchically presenting a candidate clause and sentence for an input character, including an orthographic variant and a slight difference in expression, is disclosed (Patent Document 1).

CITATION LIST

Patent Literature

Patent Document 1: JP 2004-133564 A

SUMMARY OF INVENTION

Reports in finding of medical diagnostic imaging have some regularities in a patient's symptom. Therefore, the sentence structure has a pattern. In other words, one sentence containing an input technical term has a limited pattern to easily present a sentence candidate. Moreover, in the structure of the entire report, a sentence right after one sentence is completed has some limited patterns to present likely candidates to a user.

Then, the inventors of the present invention have focused on the solution that a plurality of reports input in the past are maintained in a report data base (hereinafter referred to as "report DB"), a sentence containing an input character is retrieved from the data base, and then a sentence candidate is presented based on the retrieved sentences to improve the work efficiency and shorten the input time of a user to generate technical reports.

In addition, the sentence input by using the terminal for presenting a sentence candidate of the present invention to standardize variable sentences. The present invention can standardize the orthographic variant and the difference in expression, for example, the difference between "be possible to" and "be suggested to," which are varied depending on users.

In such a case, not only one sentence containing a technical term as an input candidate but also a sentence right before and after the sentence is presented to more efficiently input and complete the entire report including a plurality of sentences with high quality. Therefore, after one sentence is input or selected, a sentence right before and after the sentence are preferably presented as the candidates.

However, an Internet search or a method of Patent Document 1 can present information to retrieve a sentence that the user intends to search but not an entire sentence that the user finally wishes to input as a sentence candidate. Moreover, the methods cannot select a sentence right before and after an input sentence based on the entire existing report that has already been input.

In view of these problems, an objective of the present invention is to provide a terminal, a system, a method, and a program for presenting a sentence candidate, which are capable of presenting a more appropriate sentence candidate by including a report data base that stores a report including a plurality of sentences, searching the report data base by an input character, generating a report group including a plurality of reports as a search result, extracting a sentence containing a character input from the report group to generate a sentence group, and preferentially outputting a predetermined sentence based on a priority.

The first aspect of the present invention provides a terminal for presenting a sentence candidate, including:
a report data base that stores a report including a plurality of sentences;
a character input unit that receives an input of a character from a user;
a report group generation unit that searches the report data base by the input character and generates a report group including a plurality of reports as a search result;
a sentence group generation unit that extracts a sentence containing the character from each report included in the report group and generates a sentence group from a plurality of sentences extracted from the each report; and
a sentence output unit that preferentially outputs a predetermined sentence from the sentence group based on a frequency of using the character.

According to the first aspect of the present invention, a terminal for presenting a sentence candidate includes:
a report data base that stores a report including a plurality of sentences;
a character input unit that receives an input of a character from a user;
a report group generation unit that searches the report data base by the input character and generates a report group including a plurality of reports as a search result;
a sentence group generation unit that extracts a sentence containing the character from each report included in the report group and generates a sentence group from a plurality of sentences extracted from the each report; and
a sentence output unit that preferentially outputs a predetermined sentence from the sentence group based on a frequency of using the character.

The second aspect of the present invention provides a terminal for presenting a sentence candidate, including:
a report data base that stores a report including a plurality of sentences;
a sentence selection unit that receives a selection of a sentence from a user;
a report group generation unit that searches the report data base by the selected sentence and generates a report group including a plurality of reports as a search result;
a sentence group generation unit that extracts a sentence right after the selected sentence from each report included in the report group and generates a sentence group from a plurality of sentences extracted from the each report; and
a sentence output unit that preferentially outputs a predetermined sentence from the sentence group based on a frequency of using the sentence right after the selected sentence.

According to the second aspect of the present invention, a terminal for presenting a sentence candidate includes:

a report data base that stores a report including a plurality of sentences;

a sentence selection unit that receives a selection of a sentence from a user;

a report group generation unit that searches the report data base by the selected sentence and generates a report group including a plurality of reports as a search result;

a sentence group generation unit that extracts a sentence right after the selected sentence from each report included in the report group and generates a sentence group from a plurality of sentences extracted from the each report; and a sentence output unit that preferentially outputs a predetermined sentence from the sentence group based on a frequency of using the sentence right after the selected sentence.

The third aspect of the present invention provides the terminal according to the first or second aspect of the present invention, in which the sentence output unit outputs not only a predetermined sentence but also a sentence right before and after the predetermined sentence in a report from which the predetermined sentence is extracted, in response to a user's operation.

According to the third aspect of the present invention, in the terminal according to the first or second aspect of the present invention, the sentence output unit outputs not only a predetermined sentence but also a sentence right before and after the predetermined sentence in a report from which the predetermined sentence is extracted, in response to a user's operation.

The fourth aspect of the present invention provides the terminal according to the first or second aspect of the present invention, in which the sentence output unit preferentially outputs a predetermined sentence from the sentence group based on a label or a related term previously registered.

According to the fourth aspect of the present invention, in the terminal according to the first or second aspect of the present invention, the sentence output unit preferentially outputs a predetermined sentence from the sentence group based on a label or a related term previously registered.

The fifth aspect of the present invention provides a system for presenting a sentence candidate including a terminal for presenting a sentence candidate and a server provided with a report data base that stores a report including a plurality of sentences, the terminal being communicatively connected with the server, in which the terminal includes:

a character input unit that receives an input of a character from a user;

an input data transmitting unit that transmits input data input through the character input unit to the server;

an output data receiving unit that receives output data from the server; and a sentence output unit that preferentially outputs a predetermined sentence from the received output data based on a frequency of using the character, and the server includes:

an input data receiving unit that receives the input data transmitted from the terminal;

a report group generation unit that searches the report data base by the input data to generate a report group including a plurality of reports as a search result;

a sentence group generation unit that extracts a sentence containing the character from each report included in the report group and generates a sentence group from a plurality of sentences extracted from the each report; and an output data transmitting unit that transmits the sentence group to the terminal as output data.

The sixth aspect of the present invention provides a method for presenting a sentence candidate executed by a computer, including the steps of:

receiving an input of a character from a user;

searching a report data base by the input character and generating a report group including a plurality of reports as a search result, the report data base storing a report including a plurality of sentences;

extracting a sentence containing the character from each report included in the report group and generating a sentence group from a plurality of sentences extracted from the each report; and preferentially outputting a predetermined sentence from the sentence group based on a frequency of using the character.

The seven aspect of the present invention provides a computer program product for use in a computer including a non-transitory computer usable medium having a set of instructions physically embodied therein, the set of instructions including computer readable program code, which when executed by the computer causes the information processing unit to:

receive an input of a character from a user;

search a report data base by the input character and generates a report group including a plurality of reports as a search result, the report data base storing a report including a plurality of sentences;

extract a sentence containing the character from each report included in the report group and generating a sentence group from a plurality of sentences extracted from the each report; and preferentially output a predetermined sentence from the sentence group based on a frequency of using the character.

The present invention can provide a terminal, a system, a method, and a program for presenting a sentence candidate, which are capable of presenting a more appropriate sentence candidate by including a report data base that stores a report including a plurality of sentences, searching the report data base by an input character, generating a report group including a plurality of reports as a search result, extracting a sentence containing a character input from the report group to generate a sentence group, and preferentially outputting a predetermined sentence based on a priority.

BRIEF DESCRIPTION OF DRAWINGS

FIG. 7 shows one example of the related term extraction process.

FIG. 9 shows one example screen when a sentence is selected.

FIG. 10 shows one example of the screen when a sentence right before and after a predetermined sentence in a report from which a predetermined sentence is extracted is selected to be output.

FIG. 12 shows one example of the screen displaying a report with a content similar to an input content.

DESCRIPTION OF EMBODIMENTS

Figure 1:
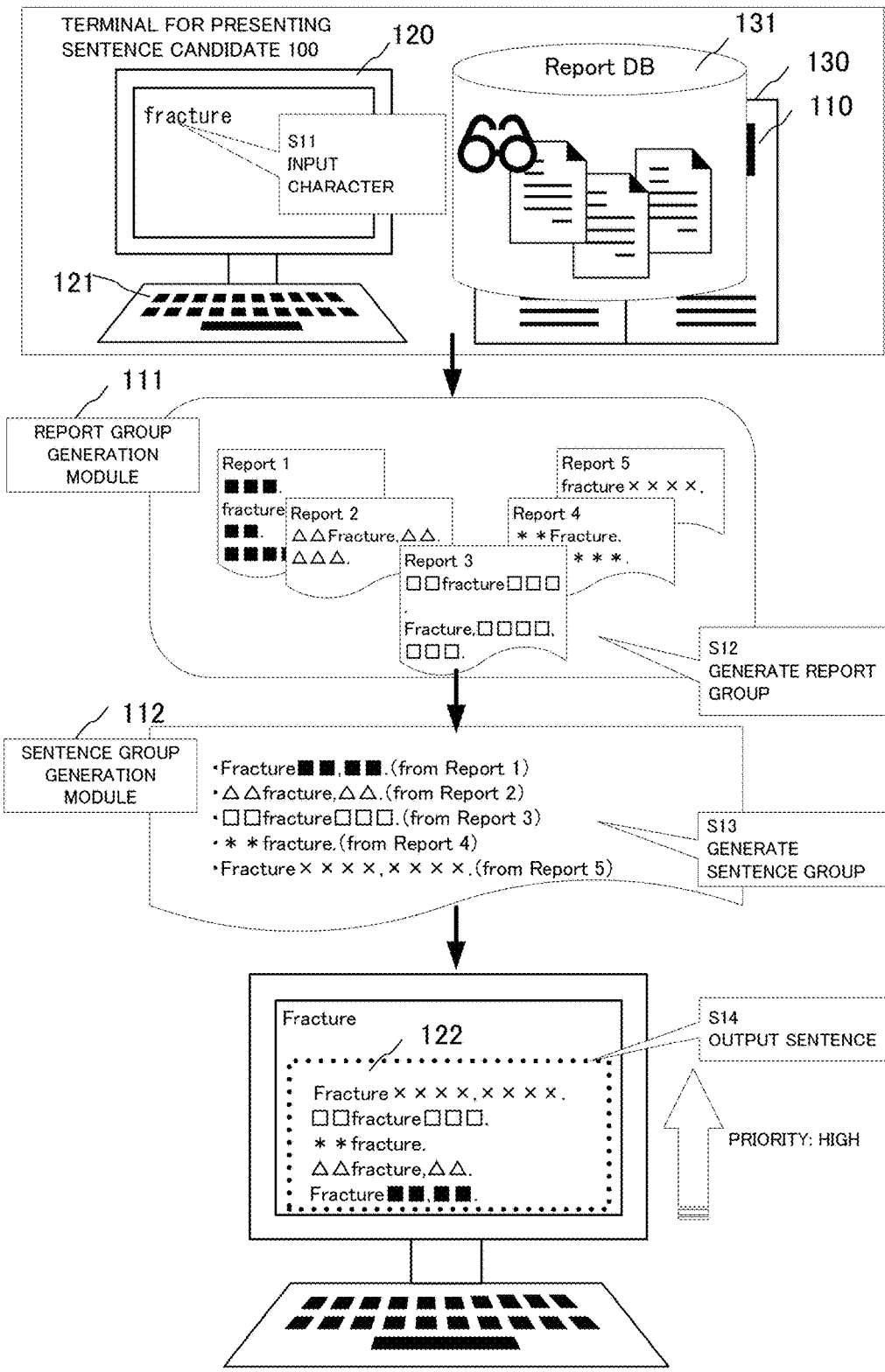
FIG. 1 shows a schematic diagram of the terminal for presenting a sentence candidate according to a preferable embodiment of the present invention.

Embodiments of the present invention will be described below with reference to the attached drawings. However, this is illustrative only, and the technological scope of the present invention is not limited thereto.

The present invention will be explained below. The overview of the terminal for presenting a sentence candidate 100 includes a report data base 131 that stores a report including a plurality of sentences; a character input unit 121 that receives an input of a character from a user; a report group generation module 111 that searches the report data base by the input character and generates a report group including a plurality of reports as a search result; a sentence group generation module 112 that extracts a sentence containing the input character from each report included in the report group and generates a sentence group from a plurality of sentences extracted from the each report; and a sentence output unit 122 that preferentially outputs a predetermined sentence from the sentence group based on a frequency of using the input character, so as to present a more appropriate sentence candidate.

Overview of Terminal for Presenting Sentence Candidate 100

FIG. 1 shows a schematic diagram of the terminal 100 for presenting a sentence candidate according to a preferable embodiment of the present invention. The overview of the terminal for presenting a sentence candidate 100 will be described below with reference to FIG. 1.

The terminal for presenting a sentence candidate 100 includes a control unit 110, an input-output unit 120, and a memory unit 130. The input-output unit 120 includes a character input unit 121 that receives an input of a character from the user and a sentence output unit 122 that outputs a sentence candidate. The memory unit 130 includes a report data base 131.

First, the user inputs a character to generate a report by using the input unit 121 of the terminal for presenting a sentence candidate 100 (step S11). At this time, the terminal for presenting a sentence candidate 100 should be executing a program to generate a report. While the program is being executed, the report data base 131 should be prepared in the memory unit 130 and available. FIG. 1 shows an example when the characters "fracture" are input.

The input unit 121 is a device such as a keyboard to input a character as shown in FIG. 1. Alternatively, a character may be input by using a touch panel, a mouse, a pen tablet, etc. However, the effects of the present invention are not limited by an input means.

After receiving an input of a character from the input unit 121, the control unit 110 performs the report group generation process by using the report group generation module 111 (step S12).

The report group generation process extracts a report containing the input characters "fracture" from the report data base. In the report group generation process, a plurality of reports are usually expected to be found from the report data base just as the name of the process. However, only one report may be found in the report group generation process. If no reports containing the input character are found, the message "Not found" or an error message may be displayed at this stage.

After generating a report group, the control unit 110 also generates a sentence group by using the sentence group generation module 112 (step S13).

The sentence group generation process acquires a sentence containing the input characters "fracture" from each of the reports extracted in the report group generation process to generate a sentence group. In the sentence group generation process, a plurality of sentences are usually expected to be extracted from a plurality of reports just as the name of the process. However, only one sentence may be found in the sentence group generation process.

Finally, a predetermined sentence is preferentially output from the generated sentence group to the output unit 122 based on a priority calculated based on a frequency of using the input characters "fracture", label, relevance degree, etc. (step S14).

In FIG. 1, a sentence containing "fracture" is horizontally displayed on from the top to the bottom of a display in descending order of priority. The way to express the priority is not limited to this. For example, the priority may be expressed depending on the color of the characters or the background, or the size of the characters or may be expressed at a display position or by numbers. A sentence is displayed on a display as an output example but may be output by voice in descending order of priority. The effects of the present invention are not limited by an output means.

Functions

Figure 2:
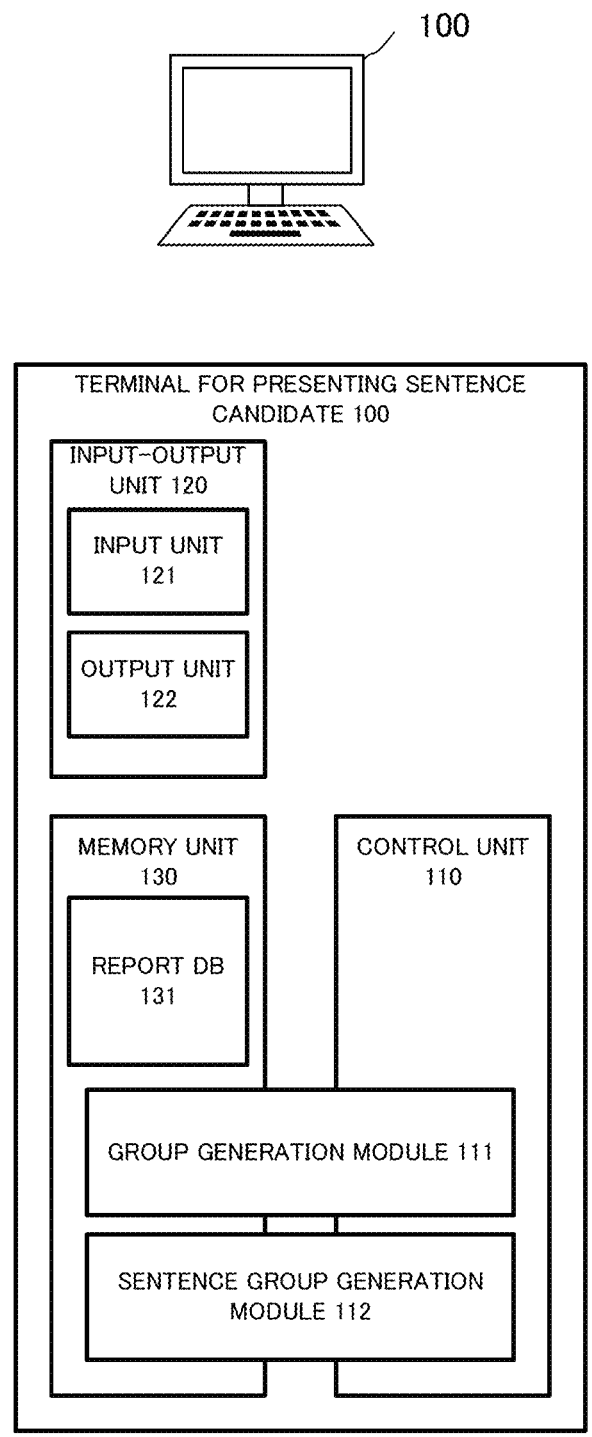
FIG. 2 shows a functional block diagram of the terminal for presenting a sentence candidate 100 to illustrate the relationship among the functions.

FIG. 2 shows a block diagram of the terminal for presenting a sentence candidate 100 to illustrate the relationship among the functions.

The terminal for presenting a sentence candidate 100 includes a control unit 110 provided with a central processing unit (hereinafter referred to as "CPU"), a random access memory (hereinafter referred to as "RAM"), and a read only memory (hereinafter referred to as "ROM").

The input-output unit 120 includes an input unit 121 and an output unit 122. As the input unit 121, a keyboard, a mouse, a pen tablet, a liquid crystal display with a touch panel function, a hardware button on the device, and a microphone to perform voice recognition may be included. As the output unit 122, various forms such as a liquid crystal display, a PC display, a projector projecting images on an external screen, and voice output from a speaker may be taken. The features of the present invention are not limited in particular by an input-output method.

As the memory unit 130, a data storage unit such as a hard disk or a semiconductor memory is included. The memory unit 130 includes a report data base 131.

In the terminal for presenting a sentence candidate 100, the control unit 110 reads a predetermined program to run a report group generation module 111 and a sentence group generation module 112 in cooperation with the memory unit 130.

Sentence Candidate Presentation Process

Figure 3:
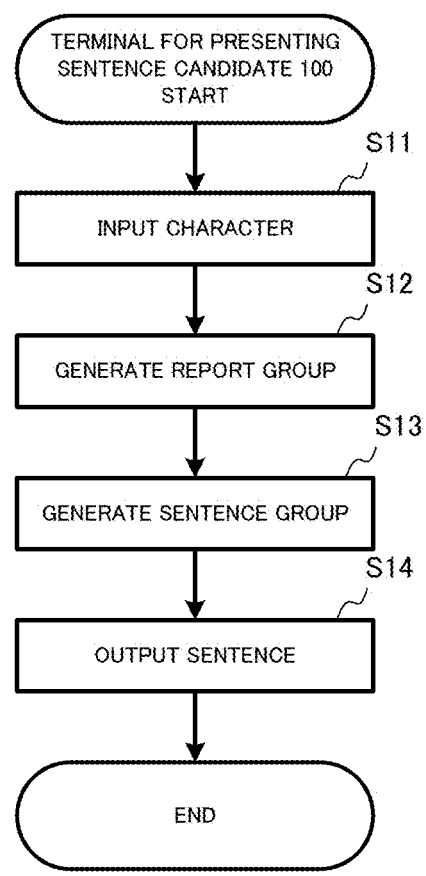
FIG. 3 shows a flow chart of the sentence candidate presentation process executed when a character is input to the terminal for presenting a sentence candidate 100.
Figure 4:
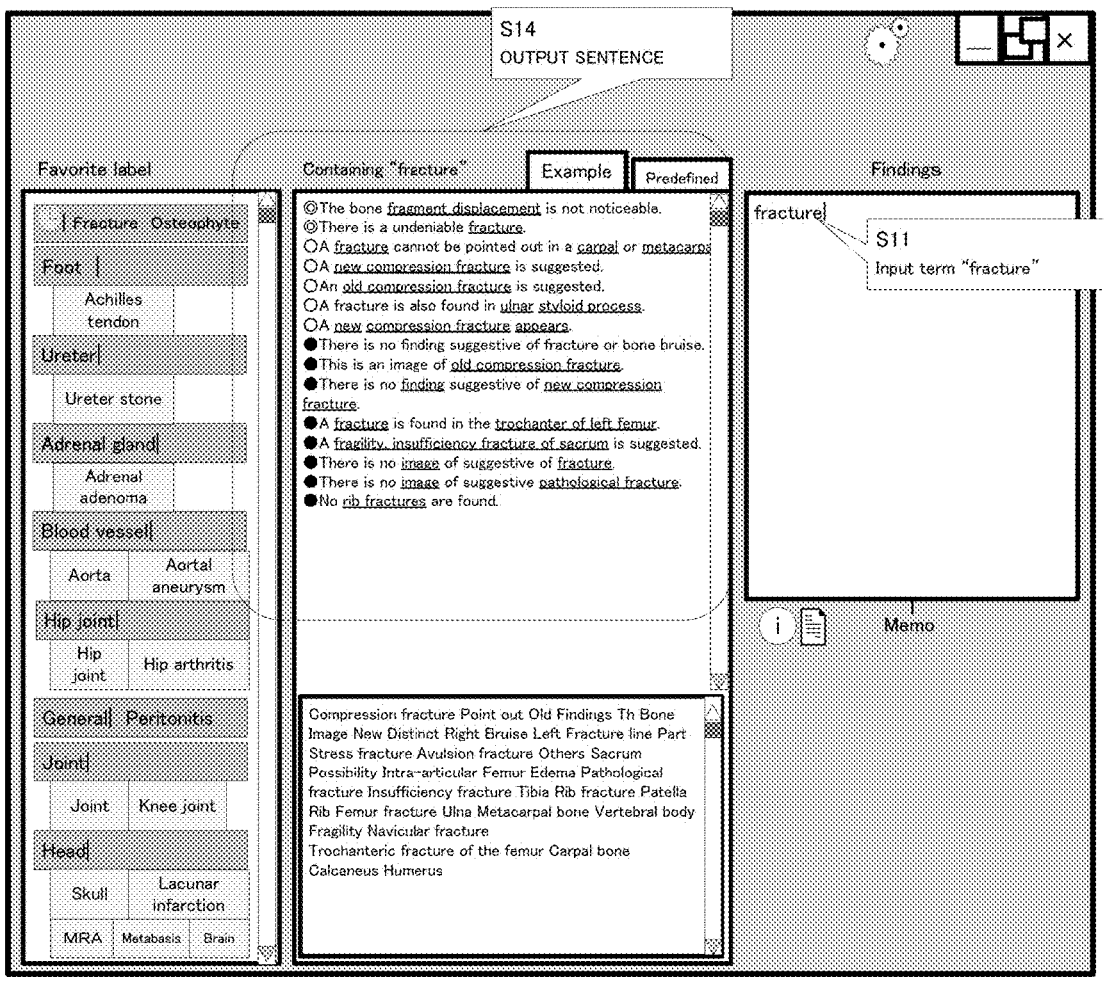
FIG. 4 shows one example screen when a character is input.

FIG. 3 shows a flow chart of the sentence candidate presentation process executed when a character is input to the terminal for presenting a sentence candidate 100. FIG. 4 shows one example screen when a character is input to produce a report. The processes performed by the units and the modules of the above-mentioned device are explained below together with this process.

The terminal for presenting a sentence candidate 100 should be executing a program to generate a report in finding of medical diagnostic imaging. While the program is being executed, the report data base 131 should be prepared in the memory unit 130 and available.

First, the terminal for presenting a sentence candidate 100 receives an input of a character from the user to the input unit 121 (step S11). FIG. 4 shows an example when the characters "fracture" are input to the finding field presented in the upper right of the screen.

After receiving an input of a character from the input unit 121, the control unit 110 performs the report group generation process by using the report group generation module 111 (step S12).

The report group generation process extracts a report containing the input characters "fracture" from the report data base.

Figure 13:
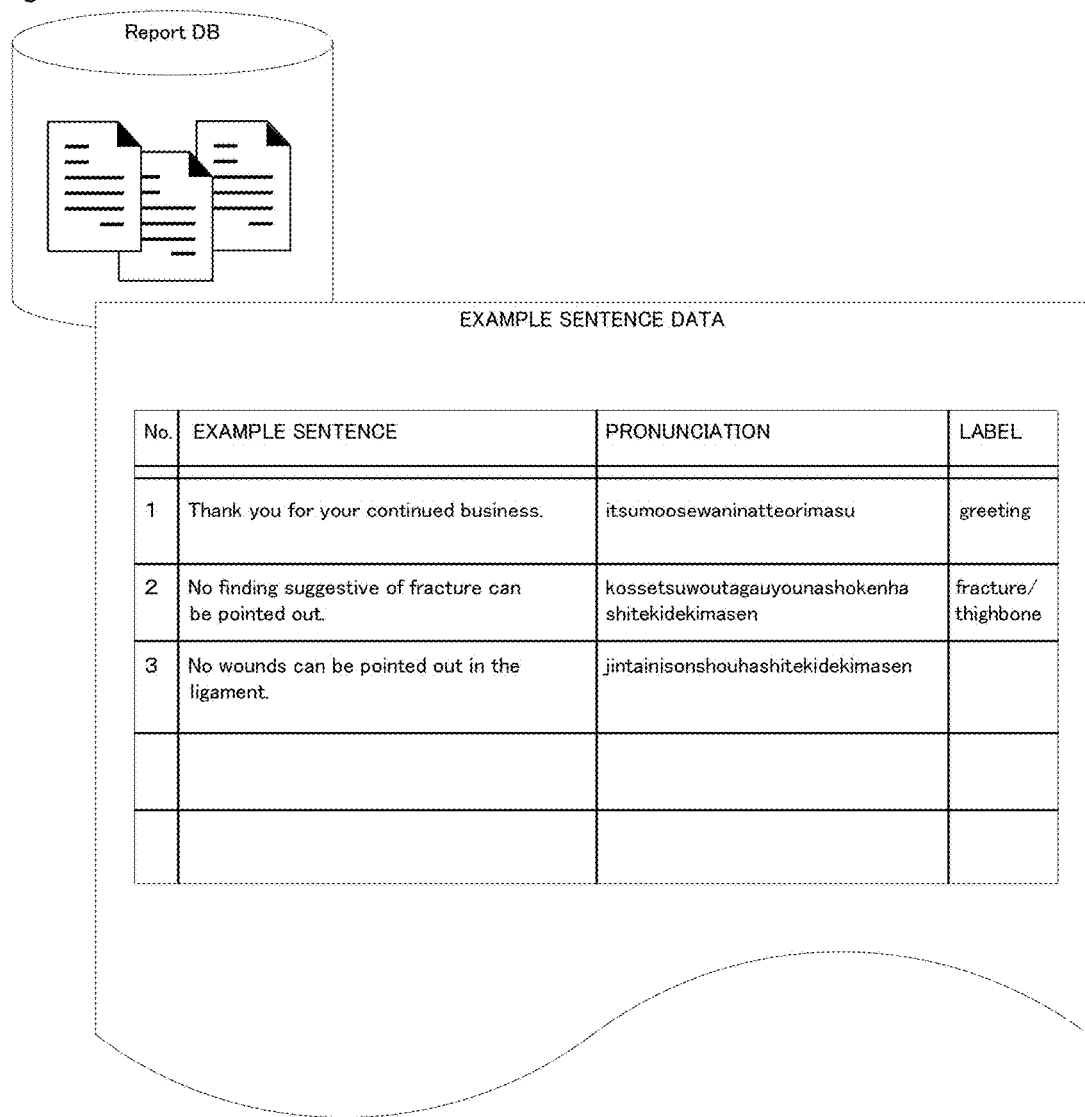
FIG. 13 shows one example of example sentence data of the report data base.

FIG. 13 shows one example of example sentence data of the report data base. The example sentence data includes information on at least "Example sentence", "Pronunciation", and "Label." "Example sentence" is used in a report. "Pronunciation" is of the example sentence. "Label" is a bookmark to be added and registered for the example sentence. In this embodiment, "Pronunciation" is expressed in katakana but may be in hiragana, regardless of whether one-byte or two-byte characters. A plurality of "Labels" can be registered to one piece of data.

For example, "Example sentence" of No. 1 is "Thank you for your continued business." Therefore, "itsumoosewaninatteorimasu" is registered in katakana as "Pronunciation," and "Greeting" as "Label." Furthermore, "Example sentence" of No. 2 is "No finding suggestive of fracture can be pointed out." Therefore, "kossetsuwoutagauyounashokenhashitekidekimasen" is registered in katakana as "Pronunciation," and "fracture" and "thighbone" as "Labels."

This report group generation process generates a group because usually finding a plurality of reports from the report data base. If only one report is found, a report group may be generated in the same way as if a plurality of reports are found. If no reports containing the input character are found, the output unit 122 may display a message, etc. at this stage. Alternatively, the process may be ended without presenting a sentence candidate.

Moreover, the report group generation process looks up not only "Example sentence" or "Pronunciation" but also "Label" to extract a report containing the input character. For example, if "thighbone" is input, "Example sentence" of No. 2 is extracted and added to the report group.

After generating a report group, the control unit 110 performs the sentence group generation process (step S13).

The sentence group generation process acquires a sentence containing the input characters "fracture" from each of the reports extracted in the report group generation process to generate a sentence group. In the sentence group generation process, a plurality of sentences are usually expected to be extracted from a plurality of reports just as the name of the process. However, only one sentence may be found in the sentence group generation process. In this case, the sentence candidate only has to be output without necessary to determine the priority.

After a sentence group is generated, the priority is finally determined based on the number of search results of the input characters "fracture", the similarity of sentences, the label, etc. in the report data base. The sentence in a sentence group is sorted or hierarchized based on this priority and output to the output unit 122 (step S14). FIG. 4 illustrates the screen outputting a sentence in the upper center.

There is a cosine similarity as one sample to judge the similarity of sentences. The cosine similarity of the input character to the example sentence in example sentence data is determined. As the value of the cosine similarity is nearer to 1, the example sentence is judged to be more similar. As the value is near to 0, the example sentence is judged to be less similar. As the similarity is higher, the priority is also higher. However, the present invention is not limited by this method of calculating a similarity. The similarity may be judged by a method appropriate to the environment.

In a method of determining the priority by using a label, for example, a sentence in which the input characters "fracture" itself is registered as a label has a higher priority than a sentence in which a sentence containing "fracture" is registered as a label.

The priority of a sentence is determined based on the number of search results of the input character, the similarity of sentences, the label, etc. Which of these is made a priority can be changed. For example, this may be changed as a setting of the entire report data base or may be set to each user.

Figure 5:
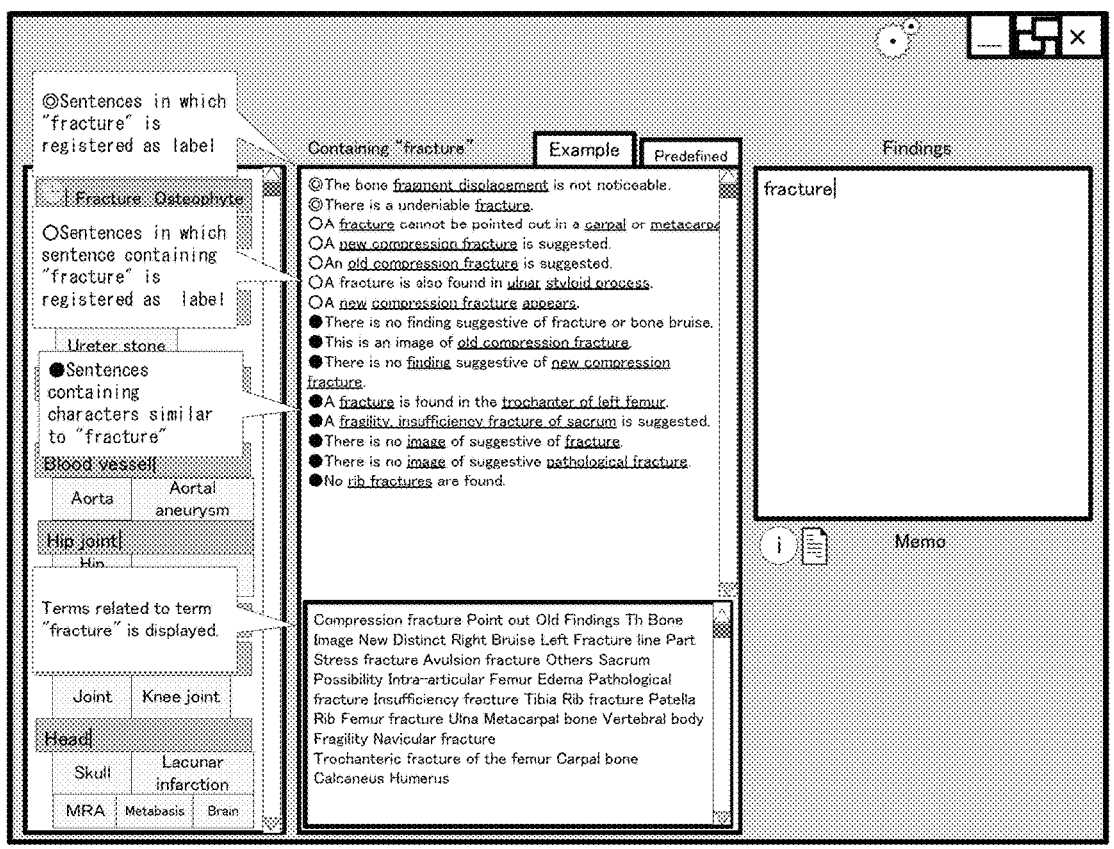
FIG. 5 shows one example screen when a predetermined sentence is preferentially output from a sentence group based on a previously registered label or related term.

FIG. 5 shows one example of displaying 'Sentences in which "fracture" is registered as label,' 'Sentences in which a sentence containing "fracture" is registered as label,' 'Sentences containing characters similar to "fracture",' in descending order of priority when the input character is "fracture." The sentences are aligned and displayed from the upper to the lower in descending order of priority with a mark to distinguish the priority according to colors and designs being displayed at the front.

FIG. 5 also displays the list of terms related to the input characters "fracture" in the lower center of the screen. Related terms are also preferable to be output in descending order of relevance degree. The selection of a term from the list of related terms provides the same effect as that provided when the term is input in the finding field presented in the upper right of the screen. For example, "fracture" is input to the finding field, and then "fracture of trochanter of femur" is selected from the similar term display field, to provide the effect of obtaining a desired input more quickly and easily.

Related Term Extraction Process

Figure 6:
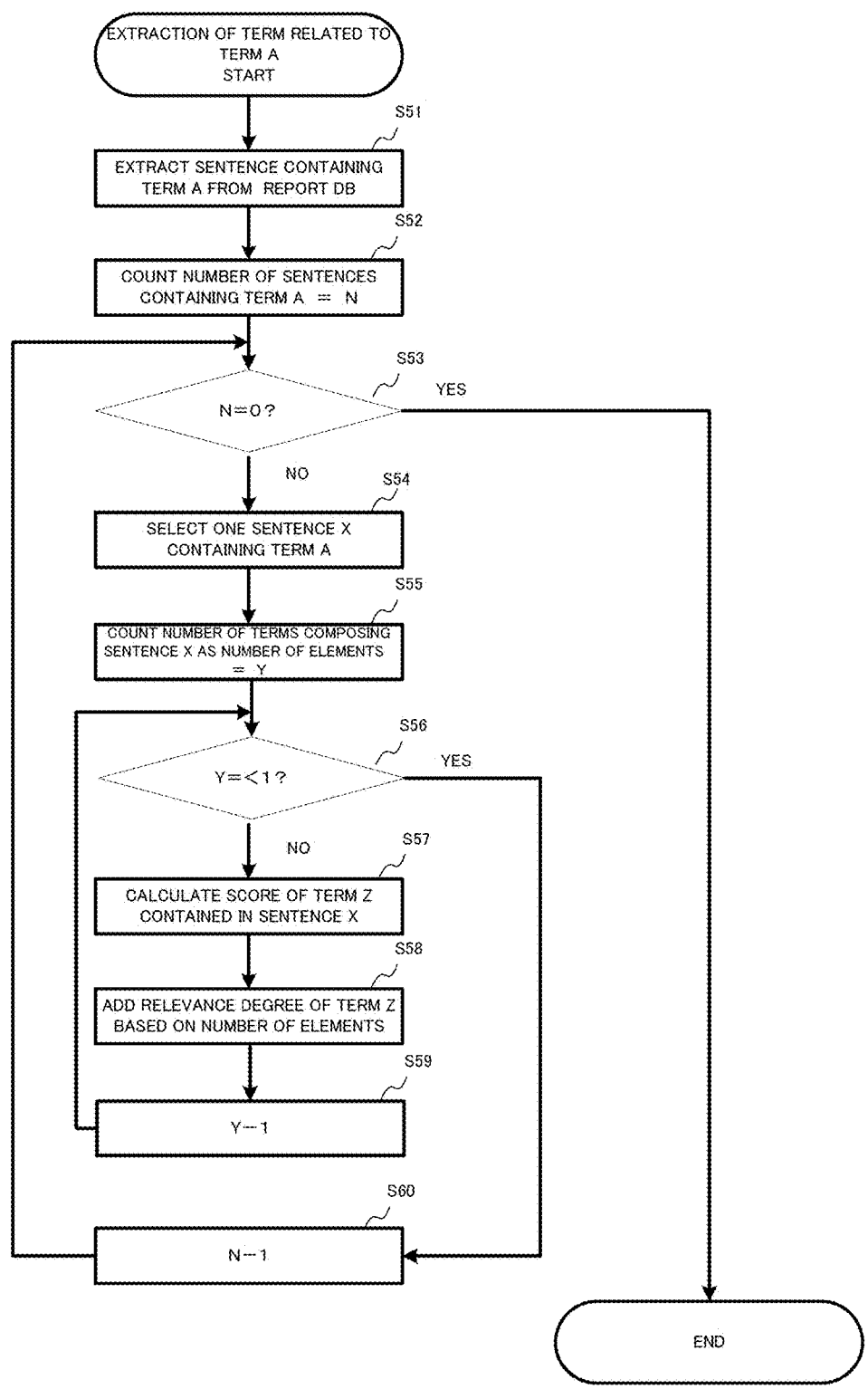
FIG. 6 shows a flow chart of the related term extraction process.

FIG. 6 shows a flow chart of the process to extract a related term and calculate its relevance degree. FIG. 7 shows one example of the process. A related term and its relevance degree may not be extracted from the data base and may be previously registered. The method of calculating a relevance degree is not limited those described above and may be the method to be described later or others.

To extract a term related to the term A, a sentence containing the term A is first extracted from the report data base (step S51). FIG. 7 shows an example of display when the term A is "lumbar vertebra."

Then, the number of sentences containing the term A is counted (step S52). In this example, the number of extracted sentence is N.

If no sentences containing the term A are extracted from the data base (N=0), the process is ended. On the other hand, if it is, the following process is performed (step S53).

Then, one sentence X containing the term A is selected (step S54). Then, the terms composing the sentence X are extracted, and the number of the terms is counted as the number of elements (step S55). In this example, the number of extracted terms is Y.

The term A itself is counted among elements. For example, as shown in FIG. 7, the four terms, "lumbar vertebra", "slight", "irregular", and "alignment" are extracted from the sentence 1, "The lumbar vertebra shows a slight irregular alignment," and the number of elements is 4. In addition, the three terms "lumbar vertebra", "straight", and "alignment" are extracted from the sentence N "The lumbar vertebra shows a straight alignment," and the number of elements is 3.

If the number of elements is 1, the sentence X contains only the term A. Therefore, the sentence X is considered to have no terms related to the term A and ended to be processed. If the number of elements is 2 or more, the following process is performed (step S56).

Then, the score of the term Z contained in the sentence X is calculated (step S57). As the term Z is more similar to the term A, the relevance degree is higher. For example, the scores of the terms, "slight," "irregular," and "alignment" contained in the sentence 1 are 5, 4, and 3, respectively as shown in FIG. 7. In addition, the scores of the terms, "straight" and "alignment" contained in the sentence N are 5 and 4, respectively. Thus, the score of the term "alignment" is varied depending on the distance from the term A "lumbar vertebra."

The score of the term Z is added based on the calculated score and the number of elements (step S58). The reason why the number of elements is considered is because the relevance degree of the term appearing at the same time in a shorter sentence is estimated to be higher. For example, as shown in FIG. 7, 0.75 obtained by dividing the score, 3, by the number of elements, 4, is added as the score of the relevance degree of the term "alignment" in the sentence 1. In addition, 1.33 obtained by dividing the score, 4, by the number of elements, 3, is added as the score of the relevance degree of the term "alignment" to the score of the term "alignment" in the sentence N. How many decimal places the relevance degree has may be freely determined according to the system. This does not limit the effects of the present invention.

If the score of one term is ended to be added, one element is ended to be processed. Then, Y is decremented by 1, and the process is returned to the step S56 (step S59).

The process is repeated until the relevance degrees of all the terms other than the term A contained one sentence are calculated. If all the terms are ended to be processed (if Y is 1 or less in the step S56), the process proceeds to the next step S60.

At this time, one sentence containing the term A has been ended to be processed. Then, N is decremented by 1, and the process is returned to the step S53 (step S60).

If all the terms including the term A are ended to be processed, (if N is 0 in the step S53), the related term extraction process for the term A is ended.

Sentence Candidate Presentation Process by Selecting One Sentence

Figure 8:
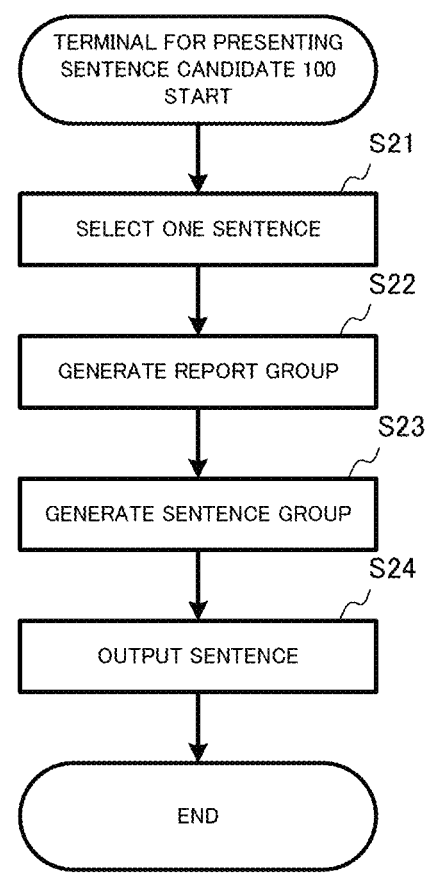
FIG. 8 shows a flow chart of the sentence candidate presentation process executed when a sentence is selected from the terminal for presenting a sentence candidate 100.

FIG. 8 shows a flow chart of the sentence candidate presentation process executed when a sentence is selected from the terminal for presenting a sentence candidate 100. FIG. 9 shows one example screen when a sentence is selected.

First, the terminal for presenting a sentence candidate 100 receives a selection of a sentence from the user to the input unit 121 (step S21). The upper screen of FIG. 9 shows an example of the screen when the sentence "A new compression fracture is suggested." is selected with the cursor from the sentence group displayed in the upper center of the screen in descending order of priority. The sentence may not be selected by a form limited to a cursor and may be selected with various forms such as voice input and eye control corresponding to the input device. In the lower screen of FIG. 9, the selected sentence is displayed in the finding field in the right.

After receiving a selection of a sentence from the input unit 121, the control unit 110 performs the report group generation process by using the report group generation module 111 (step S22).

The report group generation process extracts a report containing the selected sentence from the report data base.

After generating a report group, the control unit 110 performs the sentence group generation process (step S23).

The sentence group generation process acquires a sentence right after the selected sentence from each of the reports extracted in the report group generation process to generate a sentence group.

In this example, if the sentence A is selected, not only the selected sentence A but also a sentence similar to the sentence A is processed to generate a report group and the sentence group B. This can present more sentence candidates.

In the step S22, the sentence group C similar to the selected sentence A and its report group may be generated. In this case, a sentence right after a sentence included in the sentence group C is acquired from a report group of the sentence group C to generate the sentence group D in the step S23.

The priority is finally determined based on the number of search results of the selected sentence, the similarity of sentences, the label, etc., in the report data base. The sentence in a sentence group is sorted or hierarchized based on this priority and output to the output unit 122 (step S24).

The lower screen of FIG. 9 illustrates the screen outputting a sentence in the upper center. The sentences are aligned and displayed from the upper to the lower in descending order of priority with a mark distinguishable according to colors and designs being put at the front. At the front of the sentences, a colored or patterned mark is displayed to distinguish the priority. The difference between the sentences of the sentence group B and the sentence group D may be displayed with a mark or in different colors, etc.

If needed to be calculated, the similarity of sentences may be judged based on the cosine similarity. If needed to be calculated at a higher speed, the similarity may be judged by a process such as b-Bit MinHash. The method of more accurately calculating a similarity is used to extent that the system can maintain a necessary processing speed. However, the method of calculating a similarity is not limited in particular.

Output Process of Sentence Right Before and after Predetermined Sentence

FIG. 10 shows one example of the screen when a sentence right before and after a predetermined sentence in a report from which a predetermined sentence is extracted is selected to be output. As shown in the upper screen of FIG. 10, the cursor is pointed to the front of the sentence "No significant organic lesions are found." to display a left arrow. This left arrow is selected to display the sentence group including a sentence right before the sentence "No significant organic lesions are found." As shown in the lower screen of FIG. 10, the cursor is pointed to the back of the sentence "No significant organic lesions are found." to display a right arrow. This right arrow is selected to display a sentence group including a sentence right after the sentence "No significant organic lesions are found."

When this sentence group is displayed, the priority is determined based on the number of search results, the similarity of sentences, the label, etc., in the same process as the above-mentioned process. The sentence in a sentence group is sorted or hierarchized based on this priority and output to the output unit 122.

Collective Display Process of Similar Sentence

Figure 11:
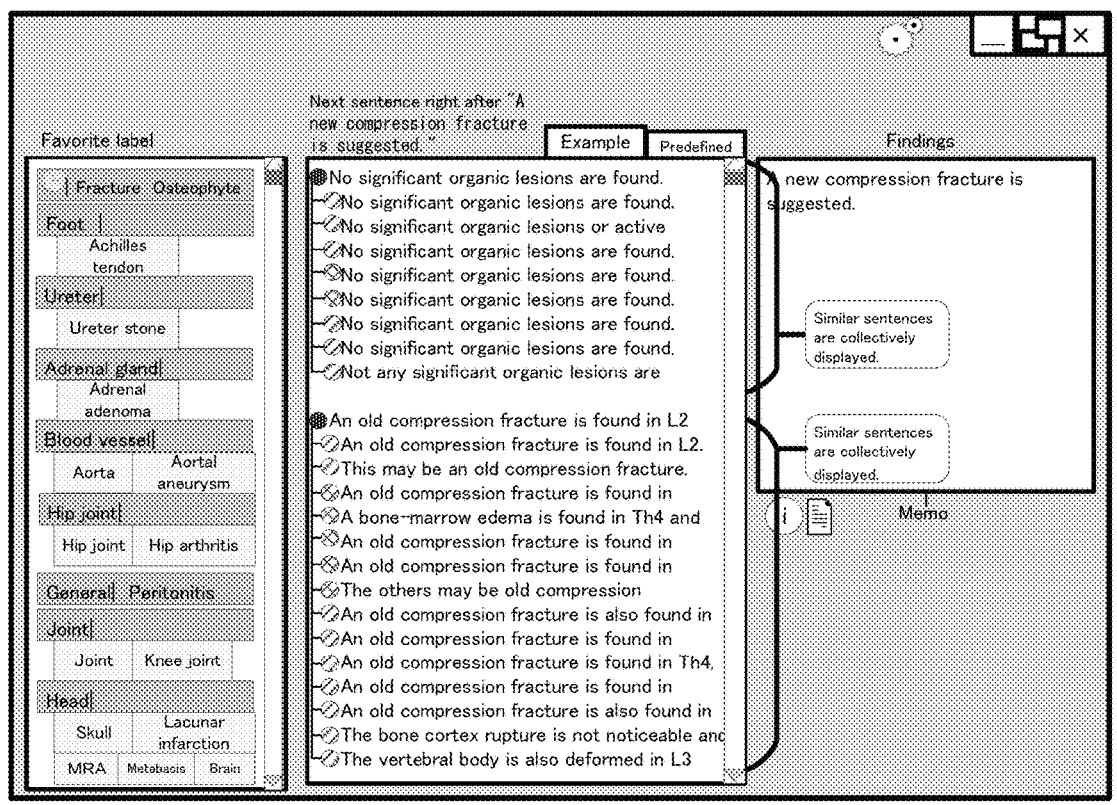
FIG. 11 shows one example of the screen collectively displaying a similar sentence.

FIG. 11 shows one example of the screen collectively displaying a similar sentence. In FIG. 11, eight sentences similar to the sentence "No significant organic lesions are found." are hierarchically displayed
Furthermore, fourteen sentences similar to the sentence "An old compression fracture is found in L2 and L4." are hierarchically displayed.

The mark displayed in the front of the sentence "No significant organic lesions are found." is selected to show or hide a sentence similar to this sentence. Moreover, the mark displayed in the front of a sentence, the color, the display order, etc., of a sentence can show the priority of the sentence. The method of collectively displaying a similar sentence in this embodiment is one example. When a sentence is selected, a sentence similar to the selected sentence only has to be output.

Furthermore, the case sensitivity and the byte sensitivity can be assimilated, and the date character string is converted to the format "year/month/day," to collectively output a sentence so that data can be standardized.

Output Process of Similar Report

FIG. 12 shows one example of the screen when a report with a content most similar to an input content is displayed. If the similar report display icon on the upper screen of FIG. 12 is selected, the report most similar to the finding "A new compression fracture is suggested." which has already been input, is displayed as shown in the lower screen of FIG. 12. Here, not only the content of a similar report but also the similarity may be displayed together with a graph and a numerical value. In this embodiment, the similar report to be displayed is selected from an icon, for example. However, a similar report may be freely selected and displayed by any method without limitation in particular.

Functions when Main Report Data Base is Stored in Server

Figure 14:
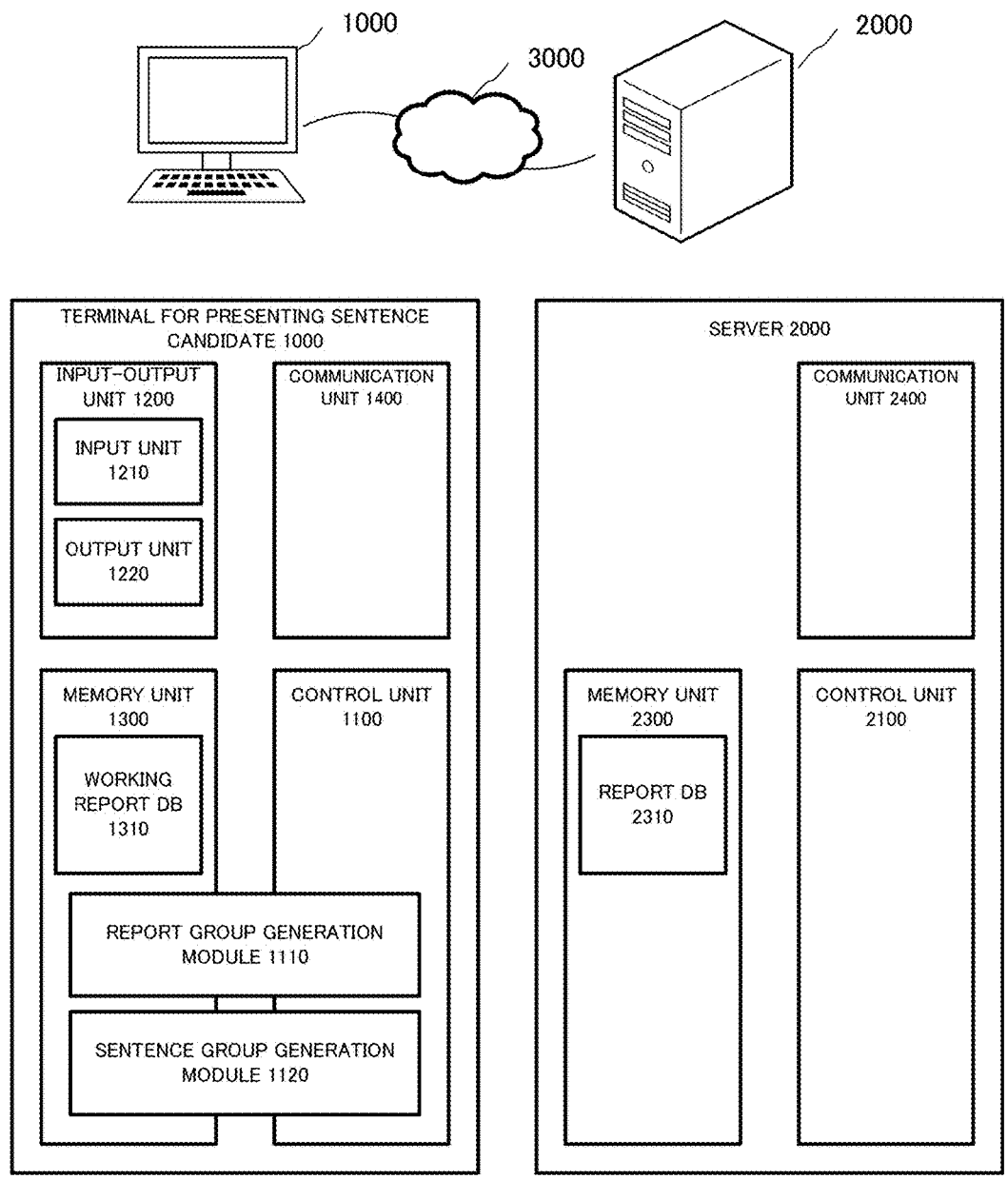
FIG. 14 shows a functional block diagram of the terminal for presenting a sentence candidate 1000 and the server 2000 to illustrate the relationship among the functions, in the case where the report data base of the present invention exists in the server 2000.

FIG. 14 shows a functional block diagram of the terminal for presenting a sentence candidate 1000 and the server 2000 to illustrate the relationship among the functions, in the case where the report data base of the present invention exists in the server 2000. The terminal for presenting a sentence candidate 1000 is connected with the server 2000 through a public line network 3000.

The server 2000 includes a control unit 2100 provided with a CPU, a RAM, and a ROM.

As the memory unit 2300, a data storage unit such as a hard disk or a semiconductor memory is included. The memory unit 2300 includes a report data base 2310. This report data base 2310 is recognized as the main report data base.

The server 2000 is communicated with the terminal for presenting a sentence candidate 1000 by using the communication unit 2400 through a public line network 3000.

The terminal for presenting a sentence candidate 1000 includes a control unit 1100 provided with a CPU, a RAM, and a ROM.

The input-output unit 1200 includes an input unit 1210 and an output unit 1220. As the input unit 1210, a keyboard, a mouse, a pen tablet, a liquid crystal display with a touch panel function, a hardware button on the device, and a microphone to perform voice recognition may be included. As the output unit 1220, various forms such as a liquid crystal display, a PC display, a projector projecting images on an external screen, and voice output from a speaker may be taken. The features of the present invention are not limited in particular by an input-output method.

The terminal for presenting a sentence candidate 1000 is communicated with the server 2000 by using the communication unit 1400 through a public line network 3000.

As the memory unit 1300, a data storage unit such as a hard disk or a semiconductor memory is included. The memory unit 1300 can maintain a report data base 1310.

In the terminal for presenting a sentence candidate 1000, the control unit 1100 reads a predetermined program to run a report group generation module 1110 and a sentence group generation module 1120 in cooperation with the memory unit 1300.

While the report data base 2310 of the server 2000 is recognized as the main report data base, the data base 1310 of the terminal for presenting a sentence candidate 1000 is recognized as the working report data base.

The terminal for presenting a sentence candidate 1000 acquires data necessary for the working report data base 1310 from the report data base 2310 of the server 2000 as the main report data base through the communication unit 1400 before receiving an input from the user. The working report data base 1310 without a network load is used during an input, so as to improve response to an input.

Moreover, when an input is completed, data input from the users are accumulated in the main report data base 2310 to improve the accuracy of the system by automatic learning and to roll out data. Therefore, the system invention has a structure to improve the usability in real time as the number of users increases.

Figure 15:
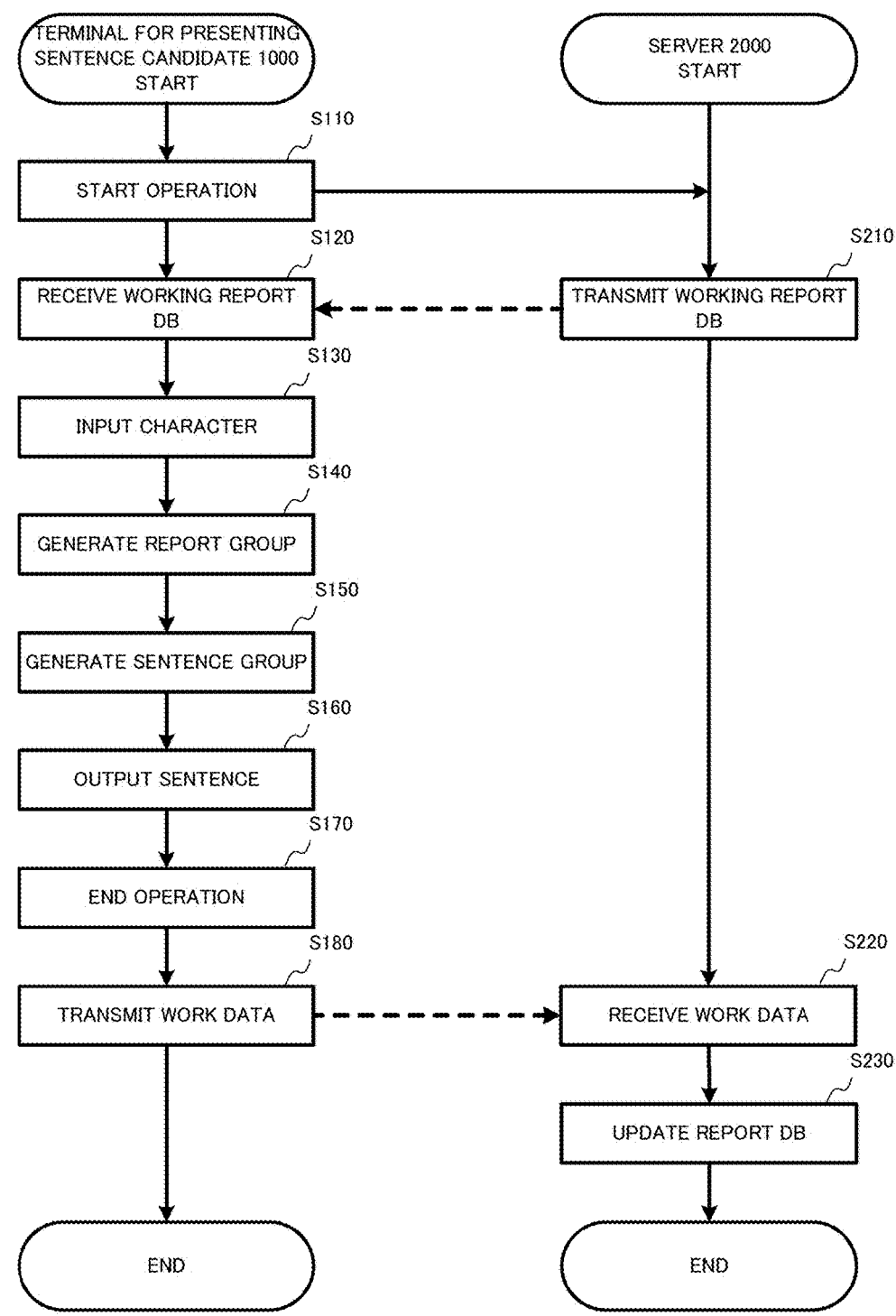
FIG. 15 shows a flow chart of the sentence candidate presentation process executed by the terminal for presenting a sentence candidate 1000 in the case where the report data base of the present invention exists in the server 2000.

Sentence Candidate Presentation Process when Main Report Data Base is Stored in Server FIG. 15 shows a flow chart of the sentence candidate presentation process executed by the terminal for presenting a sentence candidate 1000 in the case where the report data base 2310 of the present invention exists in the server 2000 in the same way.

The screen when the report data base 2310 is stored in the server 2000 is not necessary to be changed from examples shown in FIGS. 4, 5, 9, 10, 11, and 12, in particular. The screen may display that the system is running with referencing the report data base 2310 of the server 2000.

The terminal for presenting a sentence candidate 1000 should be executing a program to generate a report in finding of medical diagnostic imaging.

When an input is started, the communication unit 1400 of the terminal for presenting a sentence candidate 1000 notifies the server 2000 of the start of operation through a public line network 3000 (step S110).

The communication unit 2400 of the server 2000 transmits a working report data base necessary for the terminal for presenting a sentence candidate 1000 from the main report data base 2310 in response to this notification (step S210).

The terminal for presenting a sentence candidate 1000 receives and uses the working report data base as the working report data base 1310 (step S120).

After maintaining the working report data base 1310 in the memory unit 1300, the terminal for presenting a sentence candidate 1000 receives an input of a character from the user to the input unit 1210 (step S130).

After receiving an input of a character from the input unit 1210, the control unit 1100 performs the report group generation process by using the report group generation module 1110 (step S140).

The report group generation process extracts a report containing the input character from the working report data base 1310.

This report group generation process generates a group because usually finding a plurality of reports from the working report data base 1310. If only one report is found, a report group may be generated in the same way as if a plurality of reports are found. If no reports containing the input character are found, the output unit 1220 may display a message, etc. at this stage. Alternatively, the process may be ended without presenting a sentence candidate.

Moreover, the report group generation process looks up not only "Example sentence" or "Pronunciation" but also "Label" to extract a report containing the input character.

After generating a report group, the control unit 1100 performs the sentence group generation process (step S150).

The sentence group generation process acquires a sentence containing the input character from each of the reports extracted in the report group generation process to generate a sentence group. In the sentence group generation process, a plurality of sentences are usually expected to be extracted from a plurality of reports just as the name of the process. However, only one sentence may be found in the sentence group generation process. In this case, the sentence candidate only has to be output without necessary to determine the priority.

After a sentence group is generated, the priority is finally determined based on the number of search results of the input character, the similarity of sentences, the label, etc. in the working report data base 1310. The sentence in a sentence group is sorted or hierarchized based on this priority and output to the output unit 1220 (step S160).

The priority of a sentence is determined based on the number of search results of the input character, the similarity of sentences, the label, etc. Which of these is made a priority can be changed. For example, these data may be stored as the settings of the main report data base 2310 and applied to all users or as the settings of the working report data base 1310 to each user.

The input is ended at the timing of the end of the program, the logoff by the user, etc. (step S170).

After the end of the input, the terminal for presenting a sentence candidate 1000 transmits the work data to the server 2000 (step S180). The work data in this embodiment may be a newly input report, a label registered by the user, etc.

The server 2000 receives the work data (step S220).

The server 2000 updates the main report data base 2310 as appropriate (step S230). The main report data base 2310 may be updated at the timing when not many users use the system, in the middle of the night, etc. to distribute the load. The update timing is configurable.

An example of the case where a character is input when the main report data base 2310 is stored in the server 2000 is described above. The process flow when a sentence is selected is basically the same except that "a sentence is selected" is substituted with "a character is input" in the step S130.

Functions when Report Data Base is Stored in Only Server

Figure 16:
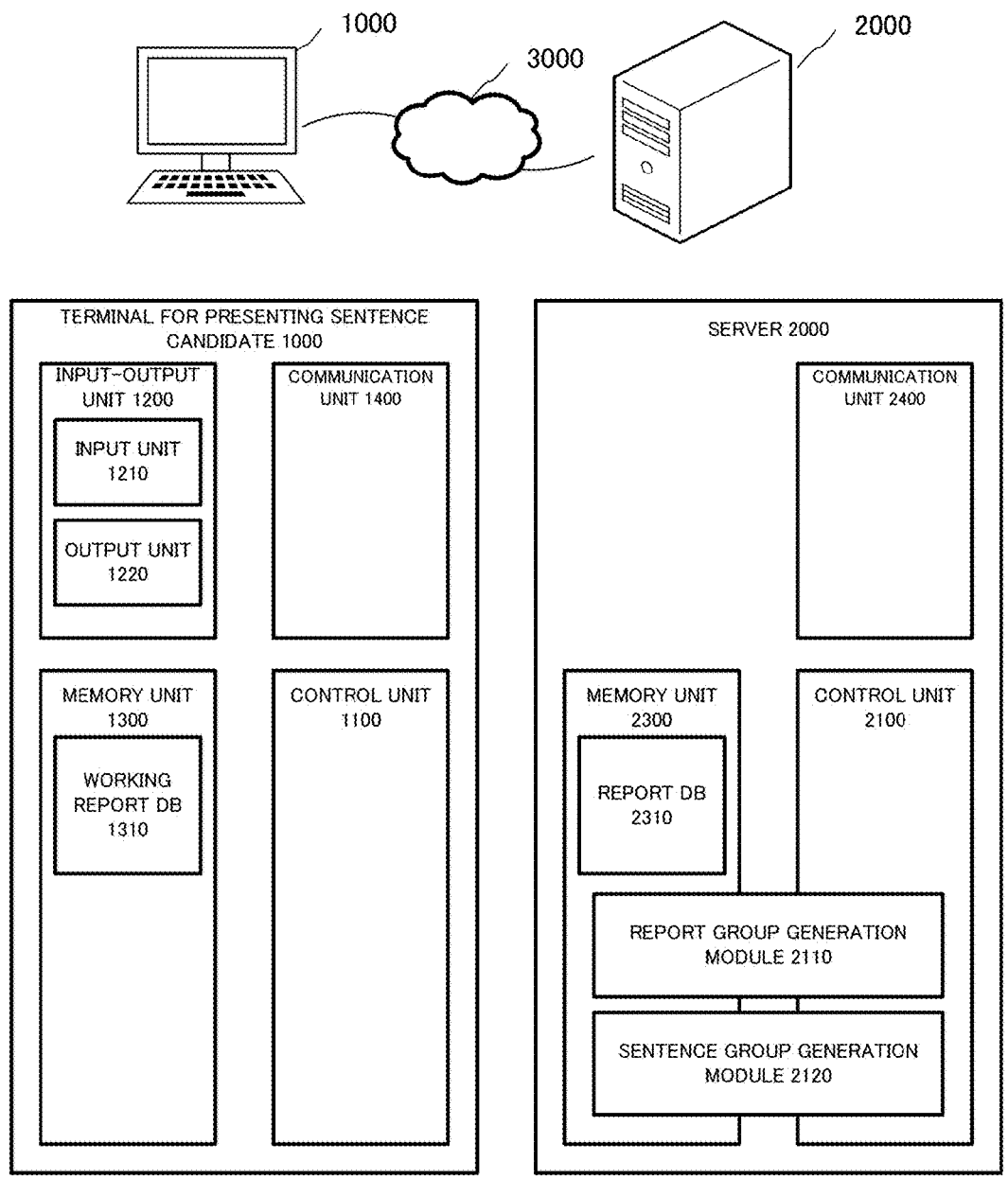
FIG. 16 shows a functional block diagram of the terminal for presenting a sentence candidate 1000 and the server 2000 to illustrate the relationship among the functions, in the case where the report data base, the report group generation module, and the sentence group generation module of the present invention exist in the server 2000.

FIG. 16 shows a functional block diagram of the terminal for presenting a sentence candidate 1000 and the server 2000 to illustrate the relationship among the functions, in the case where the report data base, the report group generation module, and the sentence group generation module of the present invention exist in the server 2000. The terminal for presenting a sentence candidate 1000 is connected with the server 2000 through a public line network 3000.

The server 2000 includes a control unit 2100 provided with a CPU, a RAM, and a ROM.

As the memory unit 2300, a data storage unit such as a hard disk or a semiconductor memory is included. The memory unit 2300 includes a report data base 2310.

In the server 2000, the control unit 2100 reads a predetermined program to run a report group generation module 2110 and a sentence group generation module 2120 in cooperation with the memory unit 2300.

The server 2000 is communicated with the terminal for presenting a sentence candidate 1000 by using the communication unit 2400 through a public line network 3000.

The terminal for presenting a sentence candidate 1000 includes a control unit 1100 provided with a CPU, a RAM, and a ROM.

The input-output unit 1200 includes an input unit 1210 and an output unit 1220. As the input unit 1210, a keyboard, a mouse, a pen tablet, a liquid crystal display with a touch panel function, a hardware button on the device, and a microphone to perform voice recognition may be included.

As the output unit 1220, various forms such as a liquid crystal display, a PC display, a projector projecting images on an external screen, and voice output from a speaker may be taken. The features of the present invention are not limited in particular by an input-output method.

The terminal for presenting a sentence candidate 1000 is communicated with the server 2000 by using the communication unit 1400 through a public line network 3000.

As the memory unit 1300, a data storage unit such as a hard disk or a semiconductor memory is included.

In this configuration, the process of the terminal for presenting a sentence candidate 1000 mainly performs input and output. Therefore, the terminal for presenting a sentence candidate 1000 needs not maintain the report data base, the report group generation module, or the sentence group generation module to require less storage capacity of the memory unit 1300.

Figure 17:
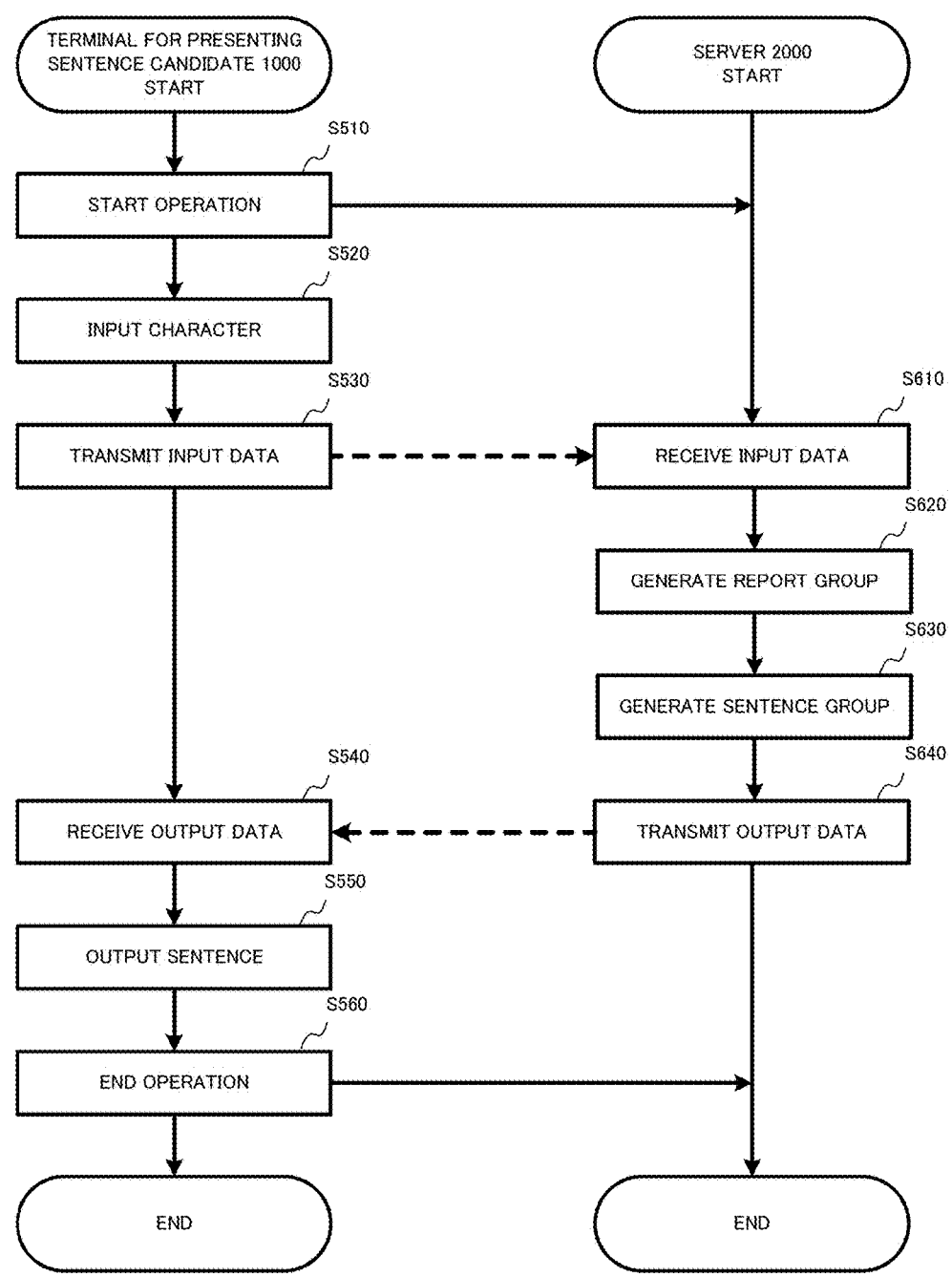
FIG. 17 shows a flow chart of the sentence candidate presentation process executed by the terminal for presenting a sentence candidate 1000 and the server 2000 in the case where the report data base, the report group generation module, and the sentence group generation module of the present invention exist in the server 2000.

Sentence Candidate Representation Process when Report Data Base is Stored in Only Server FIG. 17 is a flow chart of the sentence candidate representation process executed by the terminal for presenting a sentence candidate 1000 and the server 2000 in the case where the report data base, the report group generation module, and the sentence group generation module of the present invention exist in the server 2000.

The screen when the report data base 2310 is stored in the server 2000 is not necessary to be changed from examples shown in FIGS. 4, 5, 9, 10, 11, and 12, in particular. The screen may display that the sentence candidate representation process is performed in the server 2000.

The terminal for presenting a sentence candidate 1000 should be executing a program to generate a report in finding of medical diagnostic imaging.

When an input is started, the communication unit 1400 of the terminal for presenting a sentence candidate 1000 notifies the server 2000 of the start of operation through a public line network 3000 (step S510).

The server 2000 may be prepared to receive input data from the terminal for presenting a sentence candidate 1000 in response to this notification.

The terminal for presenting a sentence candidate 1000 receives an input of a character from the user to the input unit 1210 (step S520).

The communication unit 1400 transmits input data to the server 2000 in response to an input of a character from the input unit 1210 (step S530).

The server 2000 receives this input data by the communication unit 2400 (step S610).

The control unit 2100 of the server 2000 performs the report group generation process by using the report group generation module 2110 (step S620).

The report group generation process extracts a report containing the input character from the report data base 2310.

This report group generation process generates a group because usually finding a plurality of reports from the report data base 2310. If only one report is found, a report group may be generated in the same way as if a plurality of reports are found. If no reports containing the input character are found, the terminal for presenting a sentence candidate 1000 is notified of this judgement to display a message, etc. on the output unit 1220 at this stage. Alternatively, the process may be ended without presenting a sentence candidate.

Moreover, the report group generation process looks up not only "Example sentence" or "Pronunciation" but also "Label" to extract a report containing the input character.

After generating a report group, the control unit 2300 of the server 2000 performs the sentence group generation process (step S630).

The sentence group generation process acquires a sentence containing the input character from each of the reports extracted in the report group generation process to generate a sentence group. In the sentence group generation process, a plurality of sentences are usually expected to be extracted from a plurality of reports just as the name of the process. However, only one sentence may be found in the sentence group generation process. In this case, the sentence candidate only has to be output without necessary to determine the priority to the output unit 1220 of the terminal for presenting a sentence candidate 1000.

After a sentence group is generated, the communication unit 2400 of the server 2000 transmits data needed to be output to the terminal for presenting a sentence candidate 1000 as output data (step S640).

The communication unit 1400 of the terminal for presenting a sentence candidate 1000 receives the output data (step S540).

The server 2000 may determine a priority because the priority is based on the number of search results of the input character, the similarity of sentences, the label, etc. in the report data base. In that case, the output data contains a priority.

The priority of a sentence is determined based on the number of search results of the input character, the similarity of sentences, the label, etc. Which of these is made a priority can be changed. Moreover, the priority transmitted from the server 2000 can be updated based on the user setting stored in the terminal for presenting a sentence candidate 1000.

The terminal for presenting a sentence candidate 1000 sorts or hierarchizes the sentence in a sentence group based on the received output data and the priority and outputs to the output unit 1220 (step S550).

Finally, the terminal for presenting a sentence candidate 1000 ends the input at the timing of the end of the program, the logoff by the user, etc. and notifies the server 2000 of the end of input (step S560).

The server 2000 may stop waiting for input data from the terminal for presenting a sentence candidate 1000 in response to this notification.

An example of the case where a character is input when the report data base, the report group generation module, and the sentence group generation module are stored in the server is described above. The process flow when a sentence is selected is basically the same except that "a sentence is selected" with "a character is input" in the step S520.

The above-mentioned embodiments are explained above when applied to Japanese. However, the principle of the present invention is not limited to a language and applicable to other languages such as English, Spanish, French, German, Chinese, and Korean.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST 100, 1000 Terminal for presenting a sentence candidate
2000 Server
3000 Public line network

What is claimed is:

1. A terminal for presenting a sentence candidate, comprising:
   a report data base that stores a plurality of reports, each including a plurality of sentences;
   a sentence selection unit that receives a selection of a sentence from a user;
   a report group generation unit that searches the report data base by the selected sentence and generates a report group including a plurality of searched reports as a search result, each of the searched reports including the selected sentence;
   a sentence group generation unit that extracts a sentence right after the selected sentence from each searched report included in the report group and generates a sentence group from a plurality of sentences which are extracted from the plurality of searched reports, respectively; and
   a sentence output unit that preferentially outputs a predetermined sentence from the sentence group based on a frequency of using the sentence right after the selected sentence,
   wherein the sentence output unit outputs not only the predetermined sentence but also a sentence right before and after the predetermined sentence in a report from which the predetermined sentence is extracted, in response to a user's operation.

2. The terminal according to claim 1, wherein the sentence output unit preferentially outputs a predetermined sentence from the sentence group based on a label or a related term previously registered.

3. A system for presenting a sentence candidate, comprising a terminal for presenting a sentence candidate and a server provided with a report data base that stores a plurality of reports, each including a plurality of sentences, the terminal being communicatively connected with the server, wherein
   the terminal includes:
      a sentence selection unit that receives a selection of a sentence from a user;
      an input data transmitting unit that transmits input data input through the sentence selection unit to the server;
      an output data receiving unit that receives output data from the server; and
      a sentence output unit that preferentially outputs a predetermined sentence from the received output data based on a frequency of using the sentence right after the selected sentence; and
   the server includes:
      an input data receiving unit that receives the input data transmitted from the terminal;
      a report group generation unit that searches the report data base by the selected sentence to generate a report group including a plurality of searched reports as a search result, each of the searched reports including the selected sentence;
      a sentence group generation unit that extracts a sentence right after the selected sentence from each searched report included in the report group and generates a sentence group from a plurality of sentences which are extracted from the plurality of searched reports, respectively; and
      an output data transmitting unit that transmits the sentence group to the terminal as output data,
   wherein the sentence output unit outputs not only the predetermined sentence but also a sentence right before and after the predetermined sentence in a report from which the predetermined sentence is extracted, in response to a user's operation.

4. A method for presenting a sentence candidate executed by a computer, comprising:
   receiving a selection of a sentence from a user;
   searching a report data base by the selected sentence and generating a report group including a plurality of searched reports, each including the selected sentence as a search result, the report data base storing a plurality of reports, each including a plurality of sentences;
   extracting a sentence right after the selected sentence from each searched report included in the report group and generating a sentence group from a plurality of sentences which are extracted from the plurality of searched reports, respectively; and
   preferentially outputting a predetermined sentence from the sentence group based on a frequency of using the sentence right after the selected sentence,
   wherein preferentially outputting the predetermined sentence includes outputting not only the predetermined sentence but also a sentence right before and after the predetermined sentence in a report from which the predetermined sentence is extracted, in response to a user's operation.

* * * * *